United States Patent
Higgs

(10) Patent No.: US 10,412,043 B1
(45) Date of Patent: Sep. 10, 2019

(54) DYNAMICALLY ASSIGNING AN AUTOMATIC NUMBER IDENTIFICATION (ANI) TO A DEVICE DEPLOYED IN A CONTROLLED-ENVIRONMENT FACILITY

(71) Applicant: Securus Technologies, Inc., Carrollton, TX (US)

(72) Inventor: Joseph Higgs, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 0 days.

(21) Appl. No.: 15/726,655

(22) Filed: Oct. 6, 2017

(51) Int. Cl.
*H04L 29/12* (2006.01)
*H04N 7/14* (2006.01)
*G06Q 50/26* (2012.01)
*H04M 3/42* (2006.01)
*H04M 15/00* (2006.01)
*H04M 3/36* (2006.01)
*H04M 3/22* (2006.01)

(52) U.S. Cl.
CPC ......... *H04L 61/2061* (2013.01); *G06Q 50/26* (2013.01); *H04M 3/36* (2013.01); *H04M 3/42102* (2013.01); *H04M 3/42391* (2013.01); *H04M 15/8351* (2013.01); *H04M 15/858* (2013.01); *H04N 7/147* (2013.01); *H04L 61/605* (2013.01); *H04M 3/2281* (2013.01); *H04M 2203/2066* (2013.01); *H04M 2203/558* (2013.01); *H04M 2242/06* (2013.01); *H04M 2242/24* (2013.01)

(58) Field of Classification Search
USPC ...................................................... 348/14.11
See application file for complete search history.

(56) References Cited

U.S. PATENT DOCUMENTS

| 6,104,798 A * | 8/2000 | Lickiss | H04L 41/5054 379/201.12 |
| 2003/0161446 A1* | 8/2003 | Dammrose | H04M 3/2281 379/32.01 |
| 2013/0058469 A1* | 3/2013 | Gongaware | H04M 3/4211 379/93.03 |
| 2014/0079201 A1* | 3/2014 | Bennett | H04M 3/42229 379/142.02 |

* cited by examiner

*Primary Examiner* — Amal S Zenati
(74) *Attorney, Agent, or Firm* — Fogarty LLP

(57) ABSTRACT

Systems and methods for dynamically assigning an Automatic Number Identification (ANI) to a device deployed in a controlled-environment facility. In an illustrative, non-limiting embodiment, a system may include: a processor; and a memory coupled to the processor, the memory having program instructions stored thereon that, upon execution by the processor, cause the system to: receive a request to facilitate a communication between a resident of a controlled-environment facility and a non-resident of the controlled-environment facility, where the resident operates a device lacking a dedicated ANI; and assign a temporary ANI to the resident's device, where the temporary ANI is different from any other ANI being used by any other device in the controlled-environment facility concurrently with the communication.

20 Claims, 6 Drawing Sheets

US 10,412,043 B1

DYNAMICALLY ASSIGNING AN AUTOMATIC NUMBER IDENTIFICATION (ANI) TO A DEVICE DEPLOYED IN A CONTROLLED-ENVIRONMENT FACILITY

TECHNICAL FIELD

This specification relates generally to controlled-environment facilities, and, more particularly, to systems and methods for dynamically assigning an Automatic Number Identification (ANI) to a device deployed in a controlled-environment facility.

BACKGROUND

According to the International Centre for Prison Studies, the United States has the highest prison population per capita in the world. In 2009, for example, 1 out of every 135 U.S. residents was incarcerated. Generally, inmates convicted of felony offenses serve long sentences in prison (e.g., federal or state prisons), whereas those convicted of misdemeanors receive shorter sentences to be served in jail (e.g., county jail). In either case, while awaiting trial, a suspect or accused may remain incarcerated. During his or her incarceration, an inmate may have opportunities to communicate with the outside world.

By allowing prisoners to have some contact with friends and family while incarcerated, the justice system aims to facilitate their transition back into society upon release. Traditional forms of contact include telephone calls, in-person visitation, conjugal visits, etc. More recently, technological advances have allowed jails and prisons to provide other types of visitation, including videoconferences and online chat sessions.

To enable these various types of communications, a jail or prison may install or otherwise deploy communication and/or media access devices in different parts of the facility. Such communication and/or media access devices are generally used to enable inmate communications, but may also be used for other purposes.

SUMMARY

Systems and methods for dynamically assigning an Automatic Number Identification (ANI) to a device deployed in a controlled-environment facility are described. In an illustrative, non-limiting embodiment, a system may include: a processor; and a memory coupled to the processor, the memory having program instructions stored thereon that, upon execution by the processor, cause the system to: receive a request to facilitate a communication between a resident of a controlled-environment facility and a non-resident of the controlled-environment facility, where the resident operates a device lacking a dedicated ANI; and assign a temporary ANI to the resident's device, where the temporary ANI is different from any other ANI being used by any other device in the controlled-environment facility concurrently with the communication.

In some implementations, communication may be a Video Relay Service (VRS) call enabled by a carrier distinct from the controlled-environment facility. The temporary ANI may be selected from a pool having a number of ANIs smaller than a total number of devices assigned to residents of the controlled-environment facility.

Additionally or alternatively, the program instructions, upon execution, may cause the system to: detect termination of the communication; and return the temporary ANI to the pool. Additionally or alternatively, the program instructions, upon execution, may cause the system to determine that a number of available ANIs in the pool is smaller than a threshold. Additionally or alternatively, the program instructions, upon execution, may cause the system to issue an alert indicating that the number of available ANIs is smaller than the threshold.

In some cases, the pool may be an overflow pool. Initiating access to the overflow pool may include initiating access in response to having received an electronic acknowledgement from the resident accepting an additional charge associated with accessing the overflow pool. Additionally or alternatively, initiating access to the overflow pool may include assigning a lower priority to the communication with respect to other communications based upon an attribute of the resident. The attribute may include an identity of the resident or a balance in an account of the resident.

The program instructions, upon execution, may cause the system to: forecast, based upon historical trends, a time period where demand for ANIs is expected to exceed a total number of ANIs available in the pool; and schedule access to an overflow pool during the time period. The pool may include a first sub-pool of ANIs subject to recording or monitoring and a second sub-pool of ANIs not subject to recording or monitoring, where the temporary ANI is selected from the first sub-pool of ANIs in response to a determination that the communication is unprotected, and where the temporary ANI is selected from the second sub-pool of ANIs in response to a determination that the communication is protected.

The determination of whether the communication is protected or unprotected may be made based upon an identity or ANI of a called party. The program instructions, upon execution, may further cause the system to instruct a carrier that the communication is being recorded based on signaling, instead of the temporary ANI.

In another illustrative, non-limiting embodiment, a hardware memory device may have program instructions stored thereon that, upon execution by a processor, cause a computer system to: receive a request to facilitate a communication between a resident of a controlled-environment facility and a non-resident of the controlled-environment facility, where the resident operates a device lacking a dedicated ANI; and assign a temporary ANI to the resident's device, where the temporary ANI is different from any other ANI being used by any other device in the controlled-environment facility concurrently with the communication.

In yet another illustrative, non-limiting embodiment, a method may include receiving a request to facilitate a VRS call between a resident of a controlled-environment facility and a non-resident of the controlled-environment facility, where the resident operates a device lacking a dedicated ANI, wherein the controlled-environment facility assigns a temporary ANI to the device, and where the temporary ANI is different from any other ANI being used by any other device in the controlled-environment facility concurrently with the VRS call; and enabling the VRS call.

In various embodiments, one or more of the techniques described herein may be performed by one or more computer systems. In other various embodiments, a tangible computer-readable storage device may have program instructions stored thereon that, upon execution by one or more computer systems, cause the one or more computer systems to execute one or more operations disclosed herein. In yet other various embodiments, one or more systems may each include at least one processor and memory coupled to the processor(s), where the memory is configured to store program instructions executable by the processor(s) to cause the system(s) to execute one or more operations disclosed herein.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

Figure 1:
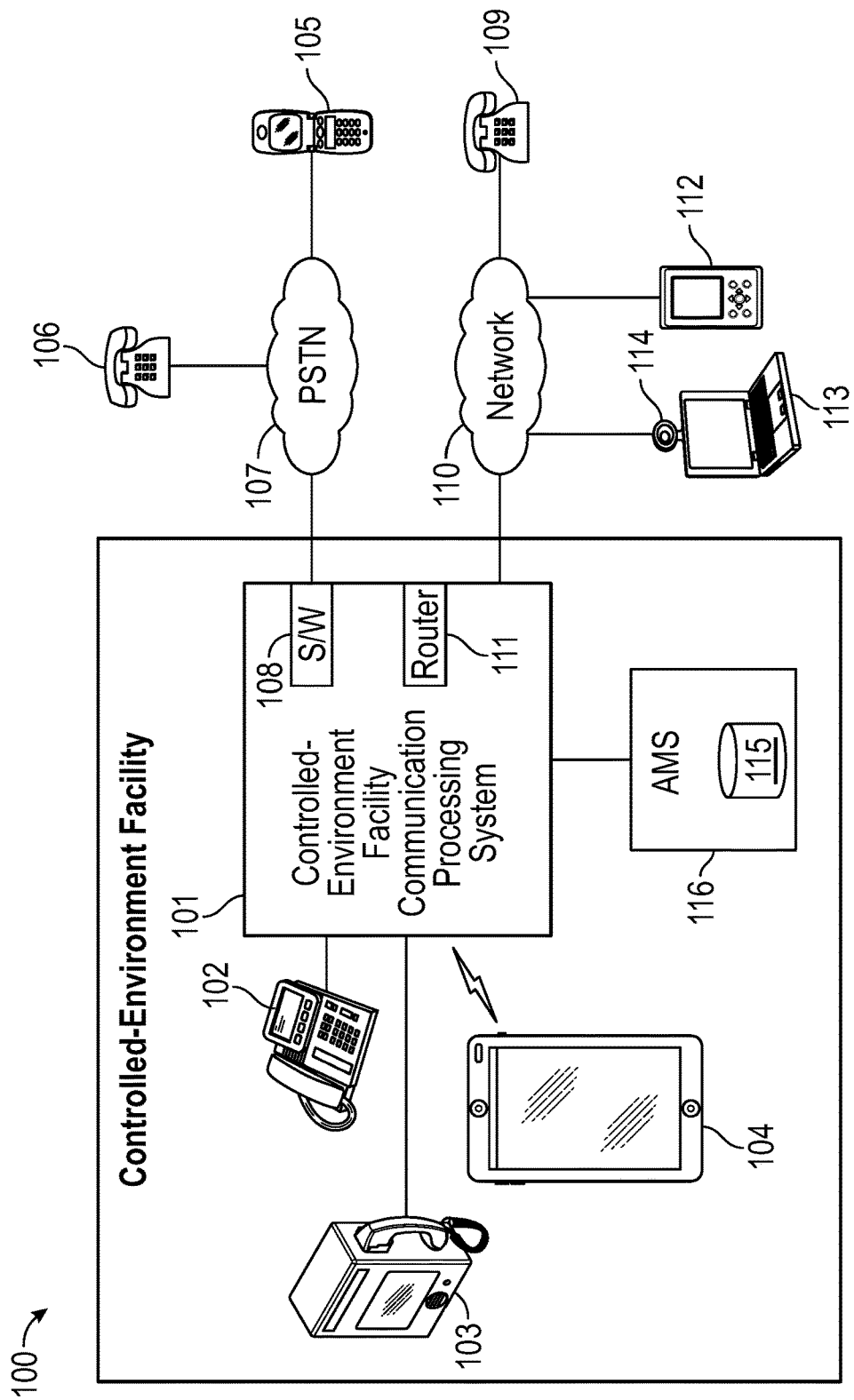
FIG. 1 illustrates a non-limiting example of a communication system deployed in a controlled-environment facility according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the scope of the claims. Also, any headings used herein are for organizational purposes only and are not intended to limit the scope of the description. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Various types of controlled-environment facilities are used in today's society, and persons may be voluntary or involuntary residents of those facilities, whether temporarily or permanently. Examples of controlled-environment facilities include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, schools, barracks, etc.), and the like.

Systems and methods described herein may be applicable to any type of controlled-environment facility and its residents. For convenience of explanation, however, various examples herein are discussed in the context of correctional facilities. In some examples, a controlled-environment facility may be referred to as a correctional facility, jail, or prison, and its residents may be referred to as inmates, arrestees, or detainees.

Even among other types controlled-environment facilities, correctional facilities stand out in that it can still present numerous unique difficulties in areas such as security, surveillance, financial transactions, communications, visitation, investigation, budgets, etc.; which in turn make technological implementations uniquely challenging in those environments. Often, technologies that are used outside of correctional facilities are not immediately applicable to the correctional environment without significant changes and modifications. Moreover, correctional facilities may have specific needs that are not particularly relevant outside of those environments. As such, some of the systems and methods described herein may be specifically tailored to address one or more of the aforementioned needs and challenges.

This specification relates generally to systems and methods for dynamically assigning an Automatic Number Identification (ANI) to a communication device (e.g., kiosk/tablet) deployed in a controlled-environment facility. Large facilities with numerous communication devices can be difficult to manage.

If each communication device used within the facility were required to have its own dedicated unique phone number, it would result in unacceptable delays and costs in maintaining and expanding the overall system. An approach would have each communication device report into a service using a variable in a Uniform Resource Locator (URL), such that the system automatically expands and assigns that communication device a unique "terminal ID." However, this approach does not work in ANI-based applications such as Video Relay Service (VRS), for example, because ANIs must work with the public switch telephone network (PSTN). Moreover, some VRS environments also require that each communication device be configured individually, rather than centrally.

To address these, and other problems, systems and methods described herein may automatically issue and release a dynamically selected, temporarily assigned ANI to a physical, telecommunication device, in some cases only for the duration needed for a particular communication or call. Additionally or alternatively, systems and methods described herein may provide a pool of available ANIs that are shared across a larger quantity of physical, telecommunication devices.

Systems and methods described herein may monitor a pool of ANIs and issue an alert and/or notification when the pool is at risk of running out of available phone numbers to accommodate peak demand, as measured against absolute trigger levels. Additionally or alternatively, demand may be measured against projected trigger levels based on historical trends and corollary (cause-effect) factors. Additionally or alternatively, systems and methods described herein may share pools of ANI across multiple customers in the event one of the pools runs low, and may use this event to trigger an alert and/or notification. Yet additionally or alternatively, systems and methods described herein may define a reserve pool for an individual customer or shared across multiple customers from which ANI phone numbers can be used in event their primary pool runs low, and may use this event to trigger an alert and/or notification.

In some embodiments, systems and methods described herein dynamically assign a phone number to an inmate device it needed or requested. In an example, these systems and methods may be used when each call must have a unique ANI (i.e., a phone number), even when there are more devices than there are phone numbers available to assign. In those cases, systems and methods described herein may: (i) allow devices to share a pool of phone numbers rather than each requiring a unique phone number, (ii) reduce the quantity of phone numbers that are needed, (iii) reduce the expenses of having more phone numbers than would be active at one time, and/or (iv) reduce the burden of provisioning "soft phones," since they no longer need a specific phone number to be assigned.

Certain communications (e.g., VRS calls) can be regulated by a government agency, for example, and those regulations may require that the same ANI not be used on two calls that overlap in time. As such, techniques discussed herein may provide a "check-out/check-in" system of phone numbers to ensure no two calls are taking place at same time with same ANI.

To avoid having to block calls due to a lack of available phone numbers, the system may monitor a pool of available phone numbers and issue alert/notifications when usage reaches definable thresholds. Thresholds may be selected in absolute levels—either based on quantity or percentage of the pool—if a threshold is crossed, then the alert/notification may be sent. Additionally or alternatively, threshold(s) may be selected using trend analysis—using a statistical analysis of the ANI pool—if historical usage patterns and/or population statistics project demand exceeding availability, then the alert is sent.

In various implementations, a provider may maintain multiple ANI pools for use in "overflow" conditions. For example, a provider may make a shared customer pool available to two or more customers, and each customer may operate one or more sites (e.g., one or more geographically distinct facilities). If a first customer runs out of phone numbers but a second customer has plenty available (while ensuring that a "safety reserve" is maintained), then an available phone number is borrowed from the second customer and the alert/notification is sent.

Turning now to FIG. 1, a block diagram of illustrative environment 100 where intelligent controlled-environment facility resident communications and/or media devices may be deployed, according to some embodiments of the present systems and methods. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a video visitation device 103 or a personal computer wireless device, such as a tablet computing device or smartphone 104 adapted or approved for use in the controlled-environment facility to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102, 103 and/or 104.

Intelligent controlled-environment facility resident communication and media devices employed in accordance with the present systems and methods may include a video visitation device 103, referred to above and herein as an IFD (e.g., a video phone particularly adapted for use in a controlled-environment facility) or personal computer wireless device 104, referred to above and herein as an IRD (e.g., a personal wireless device, such as a tablet computing device or smartphone, which may be adapted and/or approved for use in controlled-environment facility), described in greater detail below. Such an IRD may be referred to as an Intelligent Inmate Device (IID) in a correctional institution environment, and/or an IRD, or the like, in controlled-environment facilities, in general. Regardless, as noted, IFDs, IIDs, IRDs, etc. may be generally referred to herein as controlled-environment facility resident communication and/or media devices, or the like, in that they are devices that residents of a controlled-environment facility may use for communication, such as with non-residents, and/or for accessing media.

Under control of communication processing system 101, devices 102 through 104 may be capable of connecting to a non-resident's (i.e., a person not committed to a controlled-environment facility) telephone 106 or device 105 across a publicly switched telephone network (PSTN) 107. For example, telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on an Integrated Services Digital Network (ISDN), Voice-over-IP (VoIP), or packet data network 110, such as, for example the Internet. Router 111 of communication system 101 is used to route data packets associated with a call connection to destination telephone 109.

Video visitation devices 103 (also referred to as "IFD 103") are communication devices with video conferencing and/or multimedia capabilities to enable inmates to participate in voice calls, video visitation sessions with non-residents of the correctional facility, secure online chat, Internet access, email access, (restricted) social media access, etc. For example, a non-resident party may have a personal or laptop computer 113 with camera 114 (or a cell phone, tablet computer, etc.). A network connection between the parties may be established and supported by an organization or commercial service that provides computer services and software for use in telecommunications and/or VOIP, such as SKYPE®. Additionally or alternatively, the correctional facility and/or the destination may use video-conferencing equipment compatible with ITU H.323, H.320, H.264, and/or V.80, or other suitable standards.

In addition to providing certain visitation and communication operations, communication processing system 101 may, in, such as for example, a correctional facility embodiment, attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by an Administration and Management System (AMS) 116. In addition to PAC list(s), AMS 116 may also store inmate or resident profile data (RPD), as well as visitation rules applicable to each inmate.

As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

In some embodiments, database 115 may include biometric signatures of inmates (e.g., voice, facial, iris, fingerprint, etc.) and/or of other facility personnel (e.g., correctional officers, staff, etc.). In addition, database 115 may include one or more covert surveillance rules including, for example, the times and dates of scheduled covert monitoring and/or recording, identity of inmates that are the target of ongoing investigations, a maximum threshold number of inmates allowed to be in different areas within the facility at a given time, etc.

In scenarios where communication system 101 is located within the facility, it may have direct access to AMS 116. In other embodiments, however, communication system 101 may be located remotely with respect to the controlled-environment facility (or it may have certain elements disposed within the facility and other elements disposed remotely with respect to the facility) and access to AMS 116 may be obtained via a computer network such as, for example network 110.

In some cases communication system 101 may facilitate communications between devices 102-106, 109, 112, and 113 via one or more carriers or intermediate service providers. An example of such a carrier or provider is a video relay service (VRS). A VRS, also sometimes known as a video interpreting service (VIS), is a service that allows deaf, hard-of-hearing and speech-impaired (D-HOH-SI) individuals to communicate over video telephones and similar technologies with hearing people in real-time, via a sign language interpreter. In the United States, VRS services are regulated by the U.S. Federal Communications Commission (FCC).

Figure 2:
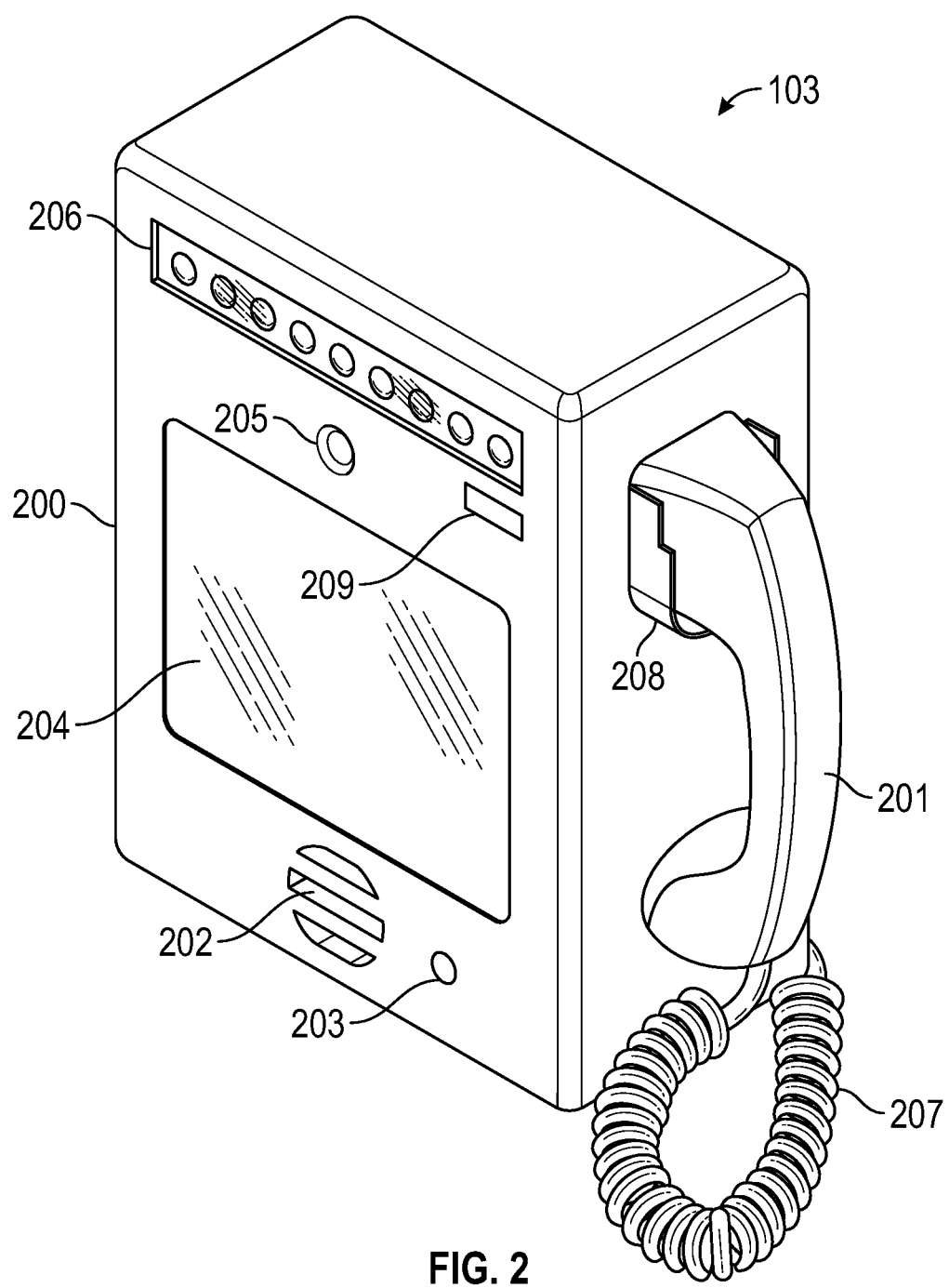
FIG. 2 illustrates a non-limiting example of a communication device deployed in a controlled-environment facility according to some embodiments.

FIG. 2 is a diagram of IFD 103, a controlled-environment facility video visitation device. In some embodiments, device 103 may be implemented as a computer-based system such as described in connection with FIG. 7. Also, in some implementations, IFD 103 may be located in a pod, which is a separate and self-contained housing unit within a correctional facility designed to hold a number of inmates (e.g., ~12 to 50 prisoners). A small number of prison officers (e.g., ~2 or 3), and sometimes a single officer or other facility personnel, supervise each pod.

Each pod may contain tiers of cells arranged around a central control station or desk from which a single officer can monitor all the cells and the entire pod, control cell doors, and communicate with the rest of the inmates. Additionally or alternatively, IFD 103 may be disposed in a visitation area of the correctional facility. In other embodiments, IFD 103 may be disposed outside of the correctional facility or within a sleeping area, such as in a cell.

As illustrated, device 103 includes display 204, camera 205, and handset 201 coupled to device 103 via wire 207. Display 204 may be any suitable electronic display such as, for example, a Liquid Crystal Display (LCD), a touchscreen display (e.g., resistive, capacitive, etc.), or the like, whereas camera 205 may be a suitable imaging device such as, for instance, a video camera or webcam equipped with Charge-Coupled Devices (CCDs), Complementary Metal-Oxide-Semiconductor (CMOS) active pixel sensors, etc. Camera 205 may be infrared sensitive in some embodiments.

Some IFDs may employ visible light sources 206 for enabling capture of conventional images and/or video. Handset 201 may be similar to a traditional telephone handset including an earpiece portion (with a loudspeaker), a handle portion, and a mouthpiece portion (with a microphone).

During a video visitation session, IFD 103 may be configured to capture a video image of an inmate to be transmitted to a non-resident using camera 205, and to display a video image of the non-resident to the inmate using display 204. An indicator, such as indictor light 209 may light to indicate that the resident's image is being captured. Additionally or alternatively, screen 204 may display an indication that the user's image is being recorded or otherwise captured. IFD 103 may also be configured to capture an audio signal from the inmate to be transmitted to the non-resident using the mouthpiece portion of handset 201, and to provide an audio signal from the non-resident to the inmate using the earpiece portion of handset 201.

Additionally or alternatively, audio received from the non-resident may be reproduced via loudspeaker 202, and audio provided by the inmate may be captured via microphone 203. In some embodiments, handset holder or holster 208 may be configured to allow a user to securely rest handset 201 against device 103 (e.g., in the "on hook" position) when device 103 is not in use. Furthermore, handset holder 208 may include a mechanical or electromechanical switch or sensor (not shown) that senses when handset 201 is not resting against it (e.g. in the "off hook" position).

It should be noted that, outside of correctional facilities, IFD 103 may assume the form of any computer, tablet computer, smart phone, etc., or any other consumer device or appliance with videoconferencing capabilities. Meanwhile, in the context of correctional facilities, IFD 103 may include one or more tampering/impact resistant or hardened elements configured to protect them from vandalism or otherwise destructive acts. For example, one or more of elements 202 through 206 may be protected by a transparent plastic or thermoplastic (e.g., Plexiglas, etc.) material.

IRDs 104, a personal resident communication and/or media device, may be tablet computing devices, smartphones, media players, or the like adapted and/or approved for use by residents of the controlled-environment facility (within the controlled-environment facility). Each IRD 104 may be particularly adapted for use in a controlled-environment. For example, such an IRD (or IID) may have a specially adapted operating system and/or may be "stripped-down," particularly from the standpoint of what apps and/or hardware are provided or allowed on IRD 104, and/or connectivity afforded such an IRD.

For example, such an IRD may employ an operating system kernel that is built for use in such an IRD in a controlled-environment facility. As a further example, the IRD may be adapted to only connect to a network provided by the controlled-environment facility, and/or in only certain locations, within the controlled-environment facility, such as may be controlled by availability of Wi-Fi access, or the like, only being available in certain areas. That is, for example, where streaming and/or downloading may be compartmentalized, leveraging the structure of the controlled-environment facility, for example, limiting the availability of a Wi-Fi signal, providing the stream through the placement of wireless access points, antenna directionality of such wireless access points, and/or the like. Further, the IRD may allow access to apps or content only upon application of security measures, by the IRD. Such security measures may include determining, by the IRD, DNS spoofing, DNS redirection, use of proxy servers for privacy and security, biometric validation, password validation, and/or the like.

Also, in accordance with embodiments of the present systems and methods, the IRD may have a few fixed apps pre-installed on the device, and installation of further apps on the device may be forbidden (i.e., prevented by modifications to the device's operating system, or the like) and/or restricted, such as by requiring permission from a facility administrator, or the like. Apps provided on IRDs might include apps of particular interest to residents of the controlled-environment facility.

For example, IRDs provided to inmates of correctional facilities, might include apps that may be of particular use to an inmate, in general, such as access to a legal research service, or of more specific interest, such as providing an inmate nearing release, access to employment searching apps or the like. Hence, such inmate IRDs may be used to help soon to be released inmates transition. For example, the IRD may be used to communicate with a future employer, or the like. As such, IRDs may be sponsored, or otherwise subsidized by organizations or companies, assisting with the transition of inmates into society.

Figure 3:
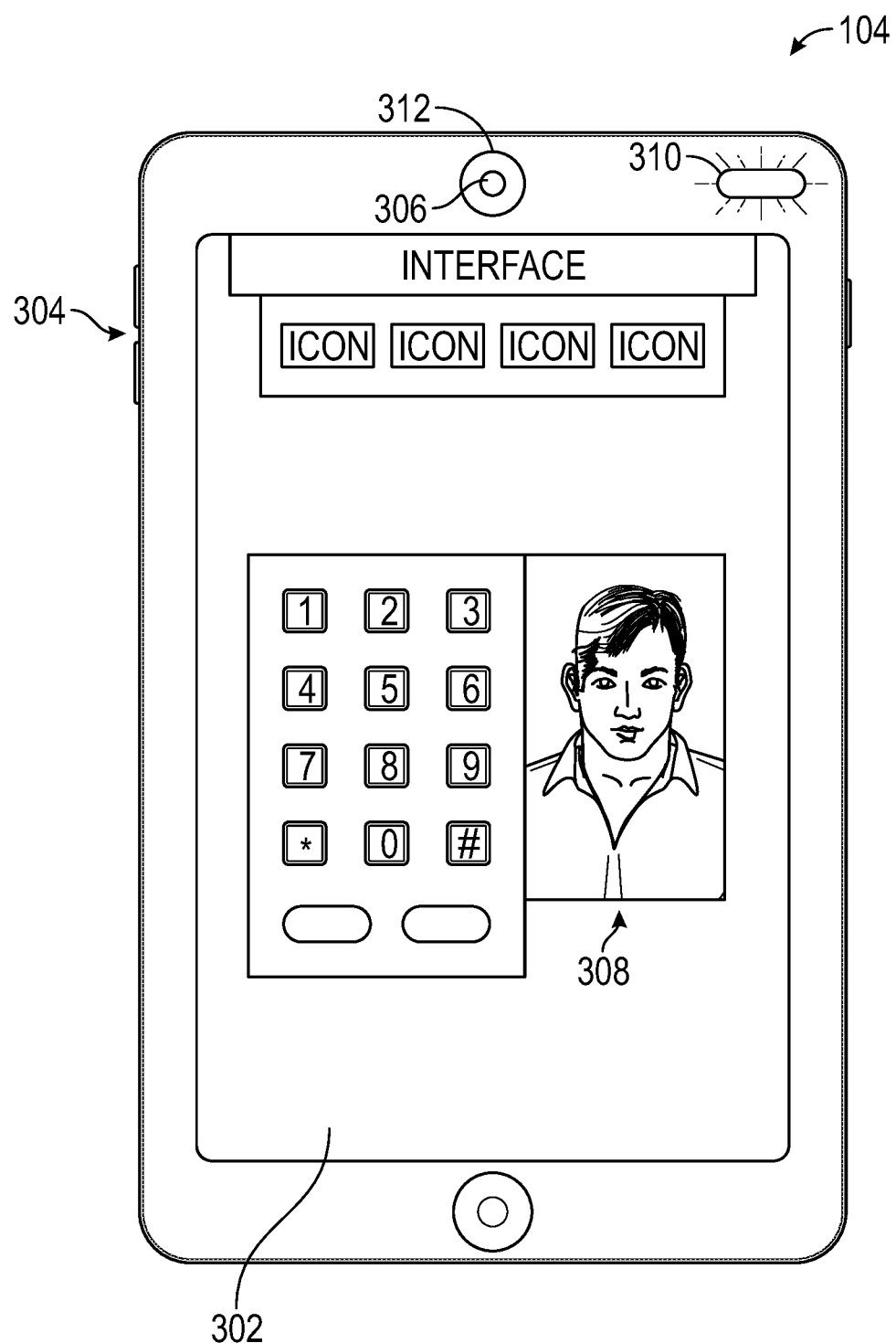
FIG. 3 illustrates a non-limiting example of another communication according to some embodiments.

FIG. 3 is a diagrammatic illustration of example intelligent personal resident communication and/or media device 104, according to some embodiments of the present systems and methods. IRD 104 includes screen 302 one or more hardware buttons 304 and a camera 306. A resident making a phone call on device 104 and talking to the called party, using open phone app 308 would appreciate that their image is being captured. Camera 306 may be capable of capturing an infrared image of a user.

Lighting of a subject during a video call may be accomplished using visible light from light 310. Alternatively or additionally, a second light source 312 (around camera 306) may provide visible and/or infrared lighting. As will be appreciated, IFD 103, IRD 104, or other similar devices have video conferencing capabilities, or the like, to enable a party to participate in video communication sessions with other call parties, such as non-residents of the controlled-environment facility, via video communication, secure online chat, etc.

Figure 4:
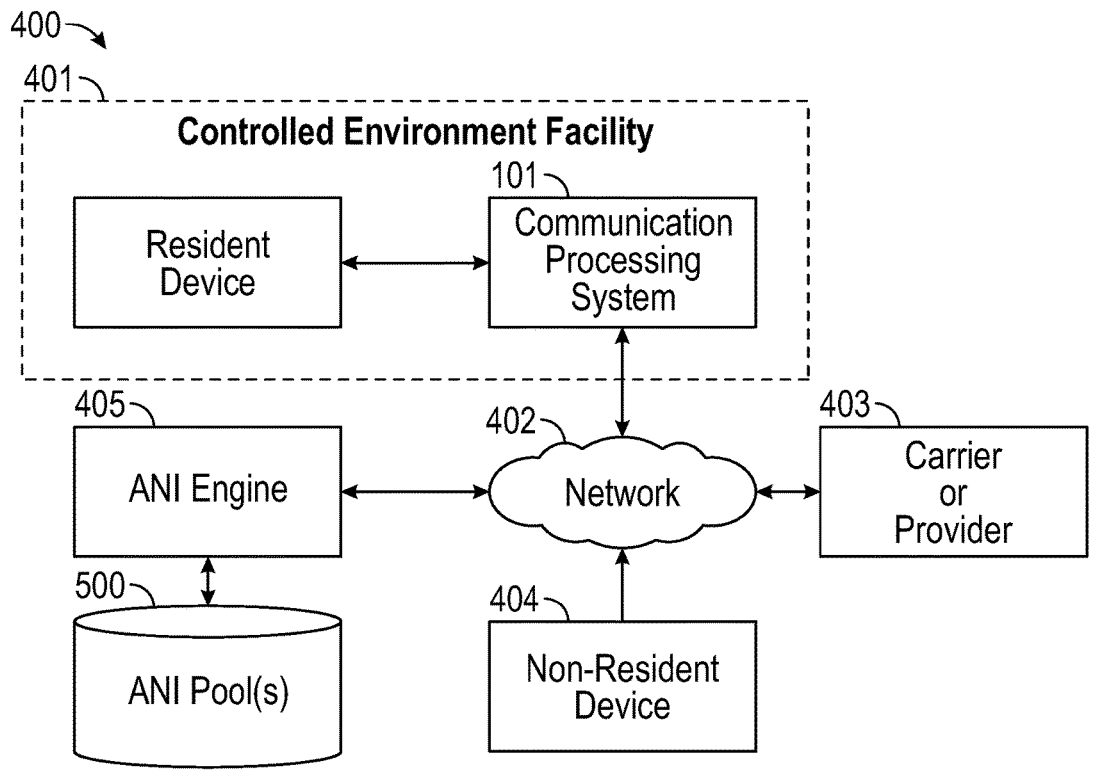
FIG. 4 illustrates a non-limiting example of a system for dynamically assigning an Automatic Number Identification (ANI) to a communication device deployed in a controlled-environment facility, according to some embodiments.

FIG. 4 illustrates a non-limiting example of system 400 for dynamically assigning an ANI to a communication device. As shown, resident device 401 (e.g., devices 102-104) is connected to communication processing system 101 of a controlled-environment facility. Communication processing system 101 may receive a request to facilitate a communication between resident device 402 and non-resident device 404 (e.g., devices 105, 106, 109, 112, and 113) across network 402 (e.g., networks 107 and/or 110).

In some cases, the request may be originated by resident device 401. Alternatively, the request may be originated by non-resident device 404 via carrier or provider 403, which is distinct from the controlled-environment facility. For example, provider 403 may be configured to support Video Relay Service (VRS) calls. Although provider 403 is often subject to a number of FCC regulations related to VRS, the controlled-environment facility is generally not.

For example, unlike non-resident device 404, resident device 401 may be lacking a dedicated, permanent, and/or unique ANI. Yet, FCC regulations may require that all devices connected by provider 403 have an ANI before certain types of calls, such as VRS calls, can be competed.

In various embodiments, upon receiving the request to facilitate the communication between resident device 402 and non-resident device 404, communication processing system 101 may access ANI engine 405, which includes ANI pool or database 500, in order to borrow an available ANI. Communication processing system 101 checks out an ANI from the same ANI pool 500, and assigns it to resident device 401—temporarily and/or for the duration for that communication.

ANI engine 405 guarantees that the checked out ANI is different from any other ANI being used by any other resident device concurrently with the communication, otherwise another, unused ANI from the same ANI pool may be assigned instead. Upon termination of the communication, communication processing system 101 notifies ANI engine 405, which then checks the ANI back into ANI pool 500.

In some implementations, ANI engine 405 may be part of communication processing system 101 within a controlled-environment facility. In other implementations, however ANI engine 405 and/or ANI pool 500 may be part of a centralized ANI management or exchange service that serves different controlled-environment facilities and/or other customers.

Figure 5:
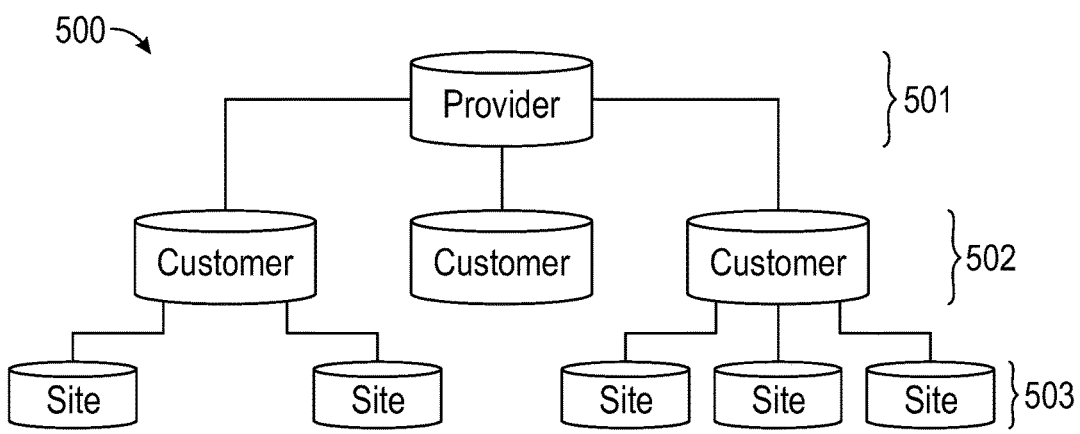
FIG. 5 illustrates a non-limiting example of an ANI pool according to some embodiments.

FIG. 5 illustrates a non-limiting example of ANI pool 500, according to some embodiments. As shown, ANI pool 500 includes ANI provider pool 501, subdivided into various customer pools 502. Customer pools 502 may each have further sub-divisions. For example, different site pools 503 may be assigned to geographically dispersed customer locations. In some cases, a given ANI may be checked out from one of pools 501-503 that has a total number of available ANIs smaller than a total number of resident devices in a respective controlled-environment facility associated with that ANI pool.

Figure 6:
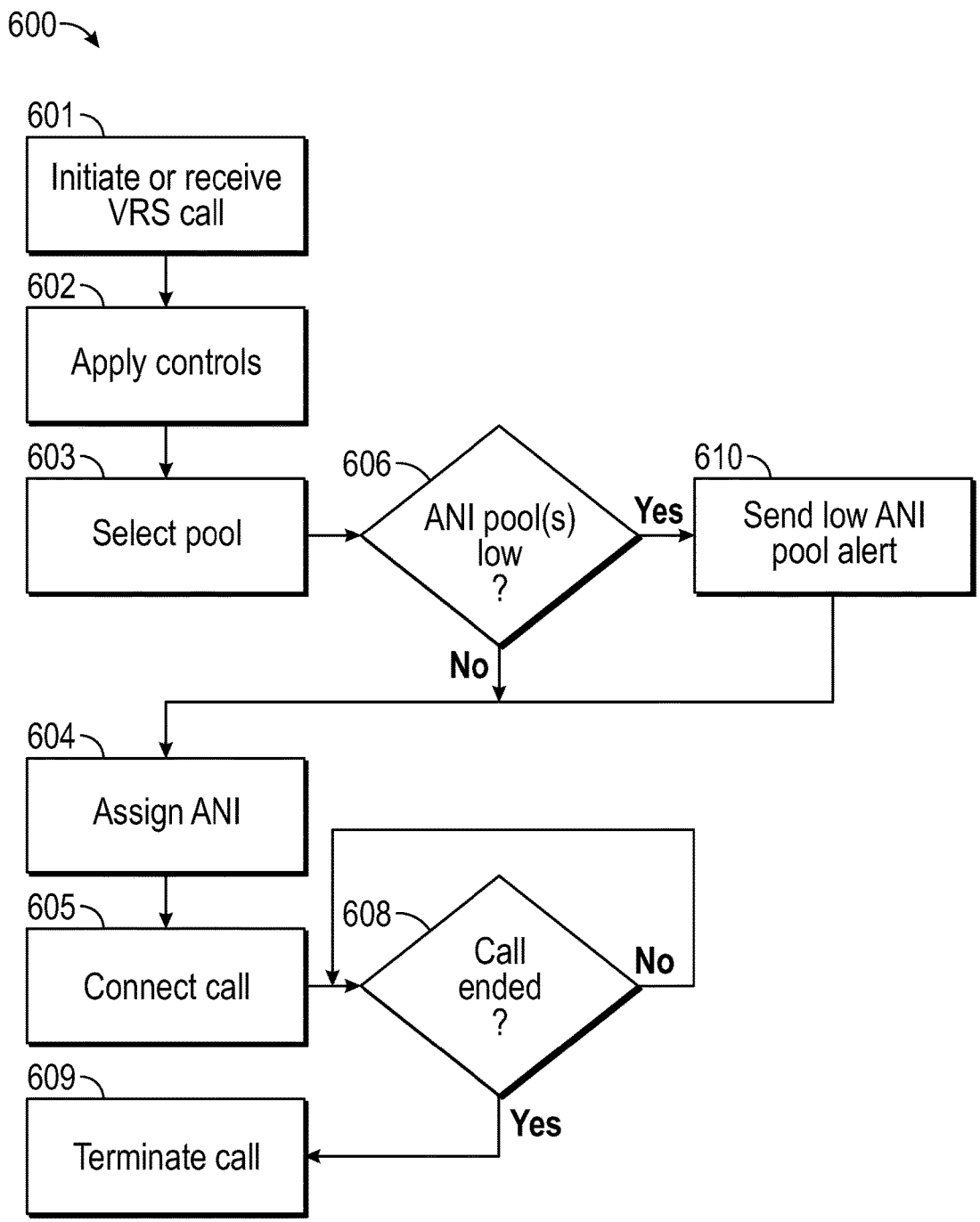
FIG. 6 illustrates a non-limiting example of a method for dynamically assigning an ANI to a communication device according to some embodiments.

FIG. 6 illustrates a non-limiting example of method 600 for dynamically assigning an ANI to a communication device. In some embodiments, method 600 may be performed by communication processing system 101, provider 404, and ANI engine 405 to enable communications, particularly VRS calls, between resident device 401 and non-resident device 404—despite resident device 401 not having a unique ANI permanently assigned to it.

At block 601, method 600 initiates/receives a VRS call from/for a resident of a controlled-environment facility using a resident device 404, such as devices 103 or 104. For example, inmate selects to place a VRS call and enters the ANI of the called party. If the request was originated by the non-resident, provider 403 and/or communication processing system may receive an identity of the inmate, and then block 602 then applies controls to the request. Similarly, calls originated by the resident will result in block 602 applying controls.

Particularly, at block 602, call controls of system 101 are applied including determination of whether call is to be recorded or not. Moreover, block 602 may determine how or whether to fulfill the request based upon one or more parameters: the identity of the calling party, the identity of the called party, the identity of the resident or inmate, the availability of an ANI in a primary or main ANI pool, the availability of an ANI in a secondary or overflow ANI pool, and/or a balance in a resident account sufficient to cover additional communication and/or ANI-related charges (e.g., access to overflow pool).

At block 603, ANI Engine 405 determines which pool of ANIs 500 is appropriate, has an available ANI, and whether any referenced ANI Pools were out/low of ANIs.

At block 604, method 600 assigns a temporary ANI to resident device 404 involved in the communication request. For example, ANI engine 405 may check out an ANI from the appropriate ANI Pool (501, 502, or 503) that are not being used by another resident device in any other communication, whether the other communication is taking place at the same or another controlled-environment facility, such as another site or customer, at the same time, and provides the ANI to the VRS device, making it unavailable for a subsequent call. The selection of the pool may be based on a hierarchy of prioritization by which ANIs are available. For example, pool 503 may be used first, but, if it is empty, then pool 502 may be used. If pool 502 is empty, then pool 501 may be used.

Additionally or alternatively, ANI engine 405 may check out an ANI from a first ANI pool of phone numbers that can be monitored or recorded when the communication is unprotected or private (e.g., when there is no attorney-client privilege between the resident and the non-resident). Alternatively, ANI engine 405 may check out an ANI from a second ANI pool of phone numbers that cannot be monitored or recorded when the communication is protected (e.g., when there is attorney-client privilege). In some cases, the determination of whether a call is private or not may be based on the identity or phone number of the called party, as opposed to the calling party's. In other cases, the recording instructions may be designated in the ANI pool and/or it may be signaled through SIP, SS7 or the like.

Additionally or alternatively, ANI engine 405 may ask a customer or a party to the communication to select a particular ANI pool among different available pools, and/or to accept additional charges associated with using overflow ANIs, and/or to accept terms or charges of an ANI exchange service sharing a common ANI pool with other customers.

In some cases, if few ANIs are available at a given time, ANI engine 405 assigns a priority to the communication with respect to other communications based upon an attribute of the resident. The attribute may be related to an identity of the resident (e.g., a gravity of a crime, a location within the controlled-environment facility where the resident is, a type of device owned by the resident etc.), a legal process being undergone by the resident (e.g., if the resident has an upcoming legal hearing, the resident's communication is ranked with a higher priority, etc.), or a balance in an account of the resident (e.g., a low or insufficient balance receives a lower priority). Additionally or alternatively, priority may be assigned based on expected revenues from competing communication requests. ANIs may be assigned in order from higher to lower priority. Moreover, if ANI pool begins to become depleted, charges to the resident's or non-resident's account may be increased.

After assigning a temporary, non-repeat ANI to resident device 401, method 600 then connects the call at block 605. When the call is a VRS call, it enables persons with hearing disabilities who use American Sign Language (ASL) to communicate with voice telephone users through video, rather than through typed text. Provider 403 links the VRS user (e.g., a resident and/or non-resident) with a human operator, so that the VRS user and the human operator can see and communicate with each other in signed conversation. In the case in which a hearing impaired person is contacting another hearing impaired person, there is no live operator involved, and the communication effectively becomes a VRS video call without additional human involvement.

At block 606, ANI Engine 405 evaluates if any of the referenced ANI Pools referenced in 603 require an alert notification. Block 606 may determine if communication processing system 101, provider 403, and/or ANI engine 405 detect any changes in the operation of system 400. For example, block 606 may determine that a number of available ANIs in the pool is smaller than a threshold (e.g., the number of available ANIs is smaller than n, the currently ANI pool is 90% depleted, etc.). Additionally or alternatively, block 606 may forecast, based upon historical trends, a time period where demand for ANIs is expected to exceed a total number of ANIs available in the pool, and it may schedule access to an overflow pool during the time period.

If any changes are detected that trigger a predetermined event, control passes to block 610. At block 610, ANI Engine 405 issues the appropriate alert for the one or more ANI Pools identified for an alert.

Block 605 may also determine whether to record or monitor the communication. If block 604 has assigned an ANI from an unprotected set of ANIs, the communication may be recorded, and, in some cases, provider 403 may determine that the call is being recorded based upon an instruction and/or by identifying the ANI as an unprotected ANI. Conversely, if block 604 has assigned an ANI from a protected set of ANIs, the communication may be recorded. Moreover, if block 605 determines that a call should be recorded or monitored while the call is ongoing (e.g., due to suspicious activity taking place during the call, such as 3-way call detection, multiple parties, detected spoken words or gestures, etc.), block 605 may record the call, in some cases, regardless of whether the ANI is from a protected pool.

In some cases, block 605 may be configured to record only a video portion of a VRS call. Additionally or alternatively, block 605 may record a voice carryover component of the VRS call. In some cases, a media relay may create a copy of the communication, and it may then record only the copy or part(s) thereof.

At block 608, communication Processing System 101 waits for (or causes) the call to end. If the communication continues, control returns to block 605. Otherwise, method 600 terminates the call at block 609, and the ANI is checked back in. ANI engine 405 "checks in" the ANI used for the call into the pool from which it came—making it available for a subsequent call. That is, the ANI assigned in block 604 may be checked back in to its original ANI pool. Alternatively, the ANI may be returned to a different ANI pool, thereafter being available to other customer or sites.

Figure 7:
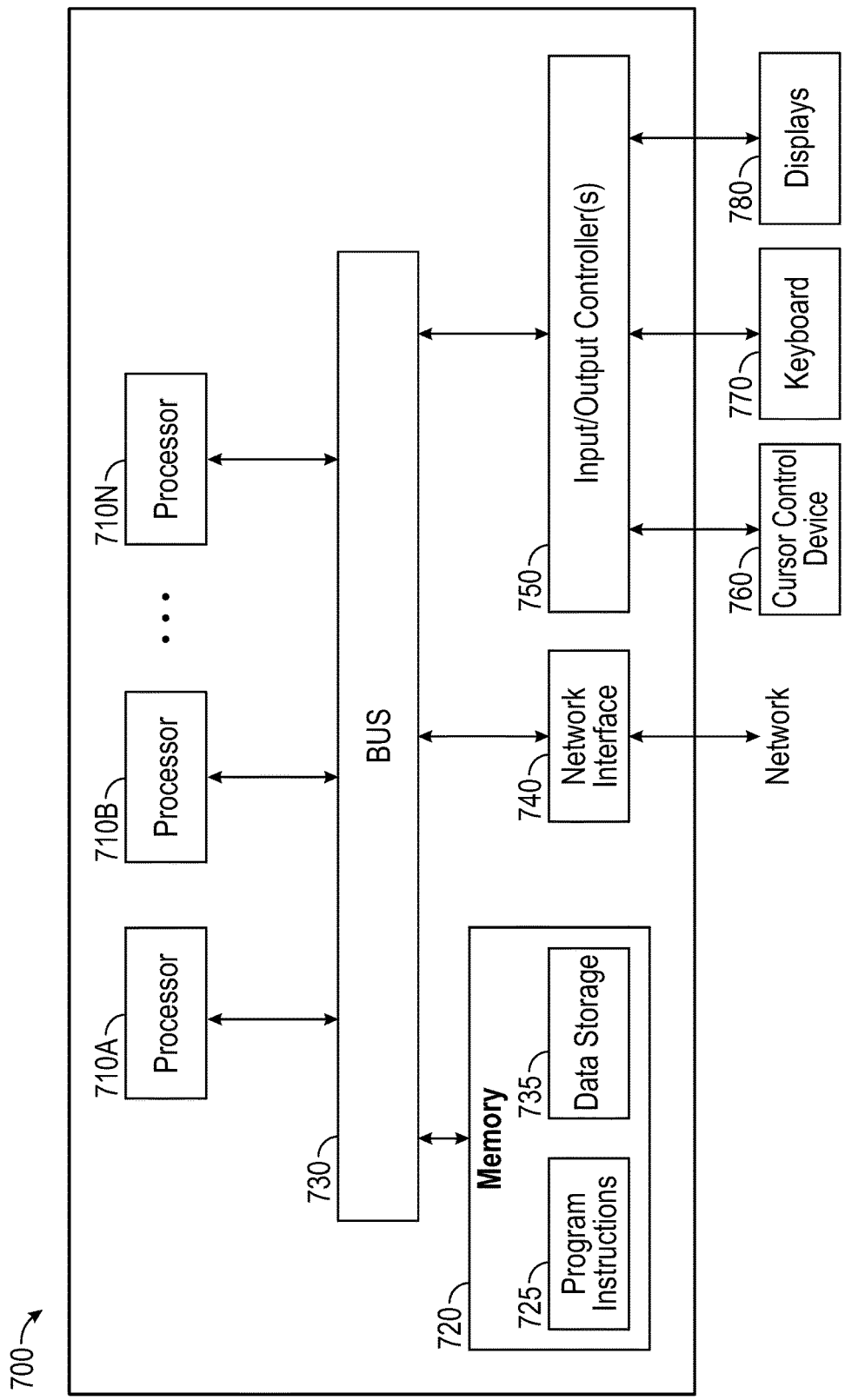
FIG. 7 illustrates a non-limiting example of a computer system configured to implement various systems and methods described herein according to some embodiments.

Embodiments of systems and methods for dynamically assigning an ANI to a device deployed in a controlled-environment facility, as described herein, may be implemented or executed by one or more computer systems. One such computer system is illustrated in FIG. 7. In various embodiments, computer system 700 may be a server, a mainframe computer system, a workstation, a network computer, a desktop computer, a laptop, or the like.

For example, in some cases, blocks 101, 116, or the like, shown in FIG. 1 may include computer system 700. Moreover, communication devices 103, 104, 105, 112, and 113 may be implemented, in whole or part, as computer system 700. As explained above, in different embodiments these various computer systems may be configured to communicate with each other in any suitable way, such as, for example, via network 110.

As illustrated, computer system 700 includes one or more processors 710A-N coupled to a system memory 720 via bus 730. Computer system 700 further includes a network interface 740 coupled to bus 730, and one or more I/O controllers 750, which in turn are coupled to peripheral devices such as cursor control device 760, keyboard 770, display(s) 780, etc. Each of I/O devices 760-780 may be capable of communicating with I/O controllers 750, for example, via a wired connection (e.g., serial port, Universal Serial Bus port) or wireless connection (e.g., Wi-Fi, Bluetooth, Near Field Communications Link, etc.) Other devices may include, for example, surveillance cameras, microphones, antennas/wireless transducers, phone detection modules, etc.

In various embodiments, computer system 700 may be a single-processor system including one processor 710A, or a multi-processor system including two or more processors 710A-N (e.g., two, four, eight, or another suitable number). Processors 710 may be any processor capable of executing program instructions. For example, in various embodiments, processors 710 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 710 may commonly, but not necessarily, implement the same ISA. Also, in some embodiments, at least one processor 710 may be a graphics processing unit (GPU) or other dedicated graphics-rendering device.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as those described herein may be stored within system memory 720 as program instructions 725 and data storage 735, respectively. In other embodiments, program instructions and/or data may be received, sent or stored upon different types of computer-accessible media or on similar media separate from system memory 720 or computer system 700.

Generally speaking, a computer-accessible medium may include any tangible or non-transitory storage media or memory media such as electronic, magnetic, or optical media—e.g., disk or CD/DVD-ROM coupled to computer system 700 via bus 730. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, bus 730 may be configured to coordinate I/O traffic between processor 710, system memory 720, and any peripheral devices in the device, including network interface 740 or other peripheral interfaces, such as input/output devices 750. In some embodiments, bus 730 may perform any necessary protocol, timing or other data transformations to convert data signals from one component (e.g., system memory 720) into a format suitable for use by another component (e.g., processor 710). In some embodiments, bus 730 may include support for devices attached through various types of peripheral buses, such as a variant of the Peripheral Component Interconnect (PCI) bus standard or the Universal Serial Bus (USB) standard, for example. In some embodiments, the function of bus 730 may be split into two or more separate components, such as a northbridge chipset and a southbridge chipset, for example. In addition, in some embodiments some or all of the functionality of bus 730, such as an interface to system memory 720, may be incorporated directly into processor(s) 710A-N.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

I/O controllers 750 may, in some embodiments, enable communications with one or more display terminals, keyboards, keypads, touchpads, scanning devices, voice or optical recognition devices, mobile devices, or any other devices suitable for entering or retrieving data by one or more computer system 700. Multiple I/O controllers 750 may be present in computer system 700 or may be distributed on various nodes of computer system 700. In some embodiments, I/O devices may be separate from computer system 700 and may interact with one or more nodes of computer system 700 through a wired or wireless connection, such as over network interface 740.

As shown in FIG. 7, memory 720 may include program instructions 725, configured to implement certain embodiments described herein, and data storage 735, comprising various data may be accessible by program instructions 725. In an embodiment, program instructions 725 may include software elements, which may be configured to effect operations. Program instructions 725 may be implemented in various embodiments using any desired programming language, scripting language, or combination of programming languages and/or scripting languages (e.g., C, C++, C#, Java™, JavaScript™, Perl, etc.). Data storage 735 may include data that may be used in these embodiments (e.g., recorded communications, profiles for different modes of operations, etc.). In other embodiments, other or different software elements and data may be included.

A person of ordinary skill in the art will appreciate that computer system 700 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

The various systems and methods illustrated in the figures and described herein represent example embodiments of systems and methods for covert monitoring and recording of audio and video in controlled-environment facilities. These techniques may be implemented in software, hardware, or a combination thereof. The order in which each operation of a given method is performed may be changed, and various elements of the systems illustrated herein may be added, reordered, combined, omitted, modified, etc. Various modifications and changes may be made as would be clear to a person of ordinary skill in the art having the benefit of this specification. It is intended that the invention(s) described herein embrace all such modifications and changes and, accordingly, the above description should be regarded in an illustrative rather than a restrictive sense.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system, comprising:
a processor; and
a memory coupled to the processor, the memory having program instructions stored thereon that, upon execution by the processor, cause the system to:
receive a request for a communication between a resident of a controlled-environment facility operating a resident device and a non-resident of the controlled-environment facility;
determine whether an Automatic Number Identification (ANI) is required by a provider of the requested communication;
determine whether the resident device is presently associated with an ANI;
select a temporary ANI from a pool of ANIs for use by the controlled-environment facility, wherein the temporary ANI is selected from a first sub-pool of ANIs if the communication can be monitored and wherein the temporary ANI is selected from a second sub-pool of ANIs if the communication cannot be monitored; and
assign the temporary ANI to the resident device, wherein the temporary ANI is different from any other ANI being used by any other device in the controlled-environment facility concurrently with the requested communication.

2. The system of claim 1, wherein the communication is a Video Relay Service (VRS) call enabled by a carrier distinct from the controlled-environment facility.

3. The system of claim 1, wherein the temporary ANI is selected from a pool having a number of ANIs smaller than a total number of devices assigned to residents of the controlled-environment facility.

4. The system of claim 3, wherein the program instructions, upon execution, further cause the system to:
detect termination of the communication; and
return the temporary ANI to the pool.

5. The system of claim 3, wherein the program instructions, upon execution, further cause the system to determine that a number of available ANIs in the pool is smaller than a threshold.

6. The system of claim 5, wherein the program instructions, upon execution, further cause the system to issue an alert indicating that the number of available ANIs is smaller than the threshold.

7. The system of claim 5, wherein the pool is an overflow pool.

8. The system of claim 7, wherein initiating access to the overflow pool further comprises initiating the access in response to having received an electronic acknowledgement from the resident accepting an additional charge associated with accessing the overflow pool.

9. The system of claim 7, wherein initiating access to the overflow pool includes assigning a lower priority to the communication with respect to other communications based upon an attribute of the resident.

10. The system of claim 9, wherein the attribute includes an identity of the resident or a balance in an account of the resident.

11. The system of claim 3, wherein the program instructions, upon execution, further cause the system to:
forecast, based upon historical trends, a time period where demand for ANIs is expected to exceed a total number of ANIs available in the pool; and
schedule access to an overflow pool during the time period.

12. The system of claim 1, wherein the temporary ANI is selected from the first sub-pool of ANIs in response to a determination that the communication is not a privileged communication, and wherein the temporary ANI is selected from the second sub-pool of ANIs in response to a determination that the communication is a privileged communication.

13. The system of claim 12, wherein the determination of whether the communication is protected or unprotected is made based upon an identity or ANI of a called party.

14. The system of claim 3, wherein the program instructions, upon execution, further cause the system to instruct a carrier that the communication is being recorded based on signaling, instead of the temporary ANI.

15. A hardware memory device having program instructions stored thereon that, upon execution by a processor, cause a computer system to:
receive a request for a communication between a resident of a controlled-environment facility operating a resident device and a non-resident of the controlled-environment facility;
determine whether an Automatic Number Identification (ANI) is required by a provider of the requested communication;
determine whether the resident device is presently associated with an ANI
select a temporary ANI from a pool of ANIs for use by the controlled-environment facility, wherein the temporary ANI is selected from a first sub-pool of ANIs if the communication can be monitored and wherein the temporary ANI is selected from a second sub-pool of ANIs if the communication cannot be monitored; and assign the temporary ANI to the resident device, wherein the temporary ANI is different from any other ANI being used by any other device in the controlled-environment facility concurrently with the requested communication.

16. A method, comprising:

receiving a request to facilitate a Video Relay Service (VRS) call between a resident of a controlled-environment facility operating a resident device and a non-resident of the controlled-environment facility;

determining whether an Automatic Number Identification (ANI) is required by a provider of the VRS call;

determining whether the resident device is presently associated with an ANI;

selecting a temporary ANI from a pool of ANIs for use by the controlled-environment facility, wherein the temporary ANI is selected from a first sub-pool of ANIs if the VRS call can be monitored and wherein the temporary ANI is selected from a second sub-pool of ANIs if the VRS call cannot be monitored;

assigning the temporary ANI to the device, and wherein the temporary ANI is different from any other ANI being used by any other device in the controlled-environment facility concurrently with the requested VRS call; and enabling the requested VRS call.

17. The method of claim 16, wherein the temporary ANI is selected from a pool having a number of ANIs smaller than a total number of devices assigned to residents of the controlled-environment facility.

18. The method of claim 17, wherein the pool is an overflow pool selected in response to a determination by the controlled-environment facility that a number of available ANIs in the controlled-environment facility is smaller than a threshold.

19. The method of claim 17, further comprising:

forecasting, based upon historical trends, a time period where demand for ANIs is expected to exceed a total number of ANIs available in the pool; and scheduling access to an overflow pool during the time period.

20. The method of claim 17, wherein the temporary ANI is selected from the first sub-pool of ANIs in response to a determination that the VRS call is not a privileged communication, and wherein the temporary ANI is selected from the second sub-pool of ANIs in response to a determination that the VRS call is a privileged communication.

* * * * *